Aug. 9, 1955 R. B. SAXON ET AL 2,714,766
AUTOMATIC PLUMB BOB
Filed Nov. 28, 1952 2 Sheets-Sheet 2
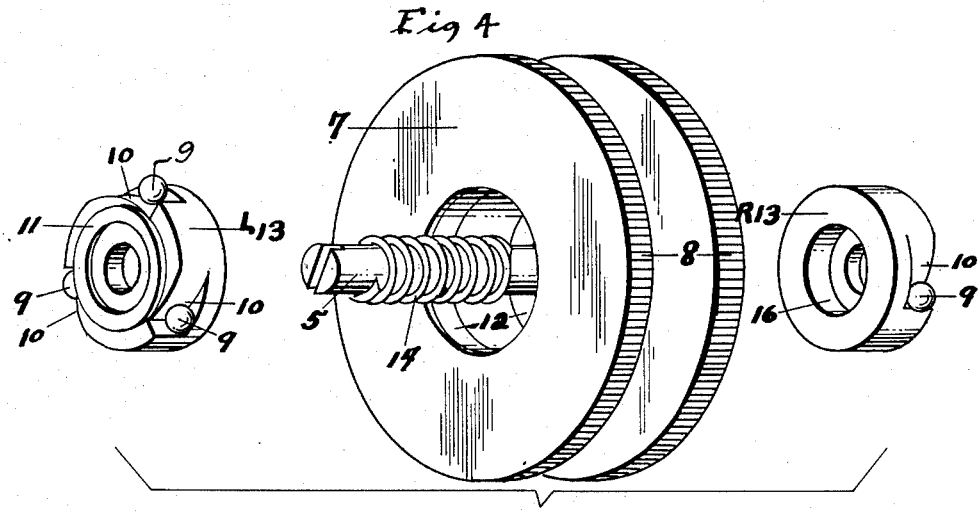
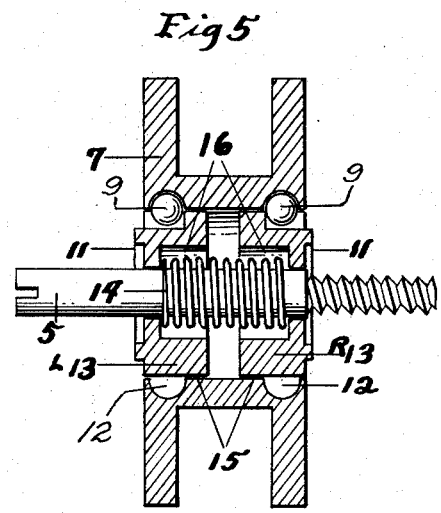
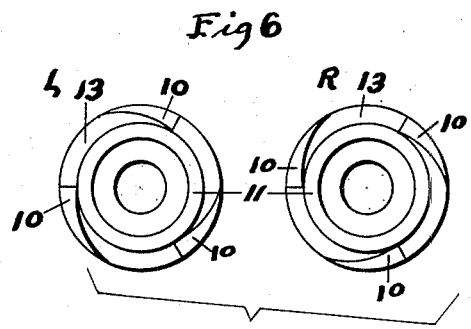
INVENTORS.
Ralph B. Saxon
Lloyd L. Saxon ically jam between bearing races 12 and wedge-shaped recesses 10. Braking units L13 and R13 then revolve with reel 7 on axle 5, causing a braking action. When reel 7 is rotated in a clockwise direction, ball bearings 9 idle against shoulders of wedge-shaped recesses 10. This automatically disengages all braking action, and reel 7 revolves freely, using as its immediate axle, points 15 of brake units L13 and R13, as indicated in Fig. 5.

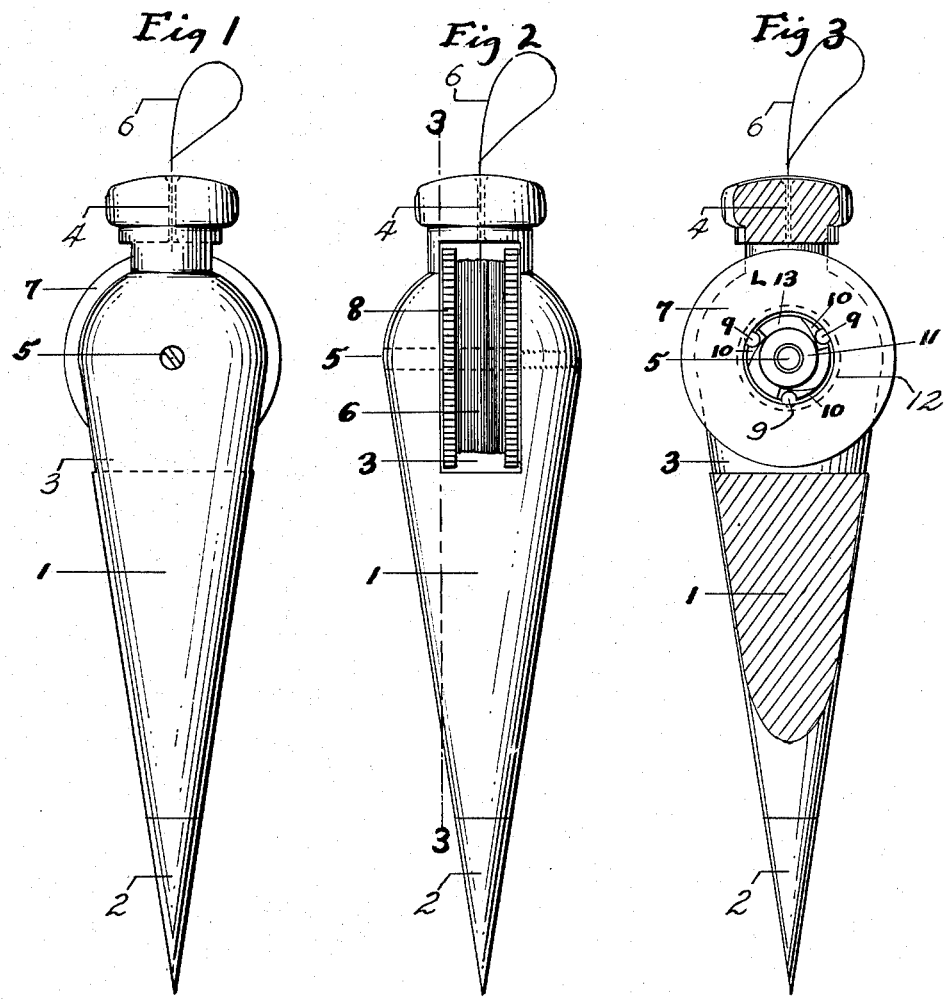

2,714,766

AUTOMATIC PLUMB BOB

Ralph B. Saxon, Minneapolis, Minn., and Lloyd S. Saxon, Tacoma, Wash.

Application November 28, 1952, Serial No. 323,017

3 Claims. (Cl. 33—217)

The invention relates to the adaption of a unique type of reel to the upper body of a specially designed plumb bob; and the objects of the invention are to facilitate a more accurate and efficient way of using the tool. We accomplish these ends by employing the use of a reel so designed that when it is rotated in one direction it automatically engages a braking action, and when rotated in the opposite direction it automatically disengages from any braking action. When this automatic plumb bob is put in use, these automatic features make it possible to hang the free end of the line to a given point and then pull the plumb bob down to any desired height. The automatic braking action being thus engaged in the reel is more than sufficient to hold the plumb bob at any desired height. Further adjustment may be made by simply turning the knurled reel one way or the other. The line may be returned to the safety of the reel by simply rotating it in the proper direction by applying the palm of the hand to its knurled surfaces. This latter act automatically and instantly disengages the braking action.

The drawings included with these specification were made from a working model, and the statements made here about this automatic plumb bob are based entirely on its performance.

The mechanical principles of this invention are illustrated in the accompanying drawings.

Fig. 1 is a vertical view of the plumb bob through the end of the axle.

Fig. 2 is a vertical view of the plumb bob through the slot.

Fig. 3 is a vertical sectional view of the plumb bob through the end of the axle, and taken from line 3—3 of Fig. 2.

Fig. 4 is an enlarged exploded view of the reel and its parts.

Fig. 5 is an enlarged sectional view of the assembled reel and braking units, with the spring and axle installed.

Fig. 6 is an enlarged view of the two braking units, showing them from their braking surface ends.

Referring mainly to Fig. 5: Compression spring 14, mounted around axle 5, presses against brake units L13 and R13, which in turn engage brake faces 11 against the inner sides of slot 3. This braking pressure remains even and constant. Number 16 indicates counter bores drilled in braking units L13 and R13 to provide necessary room for compression spring 14.

Referring to Figs. 3 and 5: When reel 7 is rotated in an anti-clockwise direction, one or more ball bearings 9 automatically jam between bearing races 12 and wedge-shaped recesses 10. Braking units L13 and R13 then revolve with reel 7 on axle 5, causing a braking action. When reel 7 is rotated in a clockwise direction, ball bearings 9 idle against shoulders of wedge-shaped recesses 10. This automatically disengages all braking action, and reel 7 revolves freely, using as its immediate axle, points 15 of brake units L13 and R13, as indicated in Fig. 5.

In Fig. 6: The only difference between braking units L13 and R13 is that the tapers of wedge-shaped recesses 10 are cut in opposite directions.

In Fig. 5: It is instructive to note that by simply depressing either braking unit L13 or R13, ball bearings 9 may be removed from that side. Thus all parts of the reel may be disassembled. Parts of the reel are assembled in the same fashion. This novel way of keeping the reel and its parts intact makes it possible to remove the reel from its slot in the plumb bob for cleaning or inspection without the hazard of losing small parts.

We claim:

1. In combination, a plumb bob having a slot passing laterally through the bob and having means for guiding a plumb line centrally upward from the slot, an axle supported in the bob at opposite sides of the slot and at right angles to the axis of the bob, a reel rotatably supported by said axle, said reel having knurled rims extending outside said slot for engagement for rotating the reel, a plumb line having one end secured to the reel and extending therefrom through said guide means, and a braking mechanism in frictional engagement relative to the bob and comprising means automatically coupling said mechanism with the reel upon rotation of the reel in the unwinding direction and automatically decoupling it from the reel upon rotation of the reel in the winding direction, said frictional engagement being sufficiently resistant to hold the reel firmly against rotation with respect to the plumb bob when the bob is hung free on said line, and sufficiently yielding to permit the reel to rotate smoothly with respect to the plumb bob when the bob is manually pulled down.

2. In combination, a plumb bob having a slot therethrough, a reel rotatably supported in the slot, a plumb line wound on the reel, and a frictional reel braking mechanism on the bob comprising means to provide a braking resistance greater than the weight of the plumb bob when the bob is suspended freely by the line, and means for automatically disengaging the reel from the braking mechanism upon rotation of the reel in a direction to wind up the line, to permit of easily returning the plumb line to the plumb bob.

3. In combination, a plumb bob having a slot passing laterally through the bob and an axial passage from the slot to the top of the bob, a reel in the slot supported upon an axle mounted in the bob, said reel having knurled manipulating members extending beyond the sides of the plumb bob, a plumb line wound around the reel and passing through said axial passage, a plurality of brake units for said reel, said brake units having wedge shaped recesses and having elements carried by said recesses and adapted automatically to engage with and disengage from said reel upon unwinding and winding rotation thereof, respectively, and means pressing the braking surfaces of said brake units continuously against opposite sides of said slot with sufficient braking force to hold the reel against rotation with respect to the plumb bob when the plumb bob is hung free on the plumb line, and sufficiently yieldably as to allow the reel to rotate smoothly with respect to the plumb bob when the plumb bob is pulled down manually.

References Cited in the file of this patent

UNITED STATES PATENTS

| | | |
|---|---|---|
| 1,076,569 | Gambllee | Oct. 21, 1913 |
| 1,626,717 | Bosserdet | Mar. 3, 1927 |
| 1,741,863 | Lyman | Dec. 31, 1929 |
| 1,814,484 | Morris | July 14, 1931 |
| 2,604,273 | Hayes | July 22, 1952 |